United States Patent
Austin, Jr.

[11] Patent Number: 5,881,543
[45] Date of Patent: Mar. 16, 1999

[54] GUARD ASSEMBLY FOR CANE CUTTER

[75] Inventor: Ray S. Austin, Jr., Fresno, Calif.

[73] Assignee: Sun-Maid Growers of California, Kingsburg, Calif.

[21] Appl. No.: 797,818

[22] Filed: Feb. 7, 1997

Related U.S. Application Data

[60] Provisional application No. 60/011,446 Feb. 9, 1996.

[51] Int. Cl.[6] ................................................. A01D 45/02
[52] U.S. Cl. ............................... 56/119; 56/233; 56/236; 56/298; 56/307; 56/320.1; 56/DIG. 20; 56/DIG. 24
[58] Field of Search ............................. 56/233, 236, 298, 56/307, 320.1, DIG. 20, DIG. 24, 119

[56] References Cited

U.S. PATENT DOCUMENTS

| | | | |
|---|---|---|---|
| 2,648,942 | 8/1953 | Grant et al. | 56/16 |
| 3,064,412 | 11/1962 | Schaeffer | 56/305 |
| 3,645,339 | 2/1972 | Williams | 171/61 |
| 3,722,196 | 3/1973 | Templeton | 56/298 |
| 4,021,999 | 5/1977 | Case | 56/298 |
| 4,432,190 | 2/1984 | Orlando | 56/1 |
| 4,445,314 | 5/1984 | Gust | 56/126 |
| 4,520,618 | 6/1985 | Sorensen et al. | 56/310 |
| 4,530,204 | 7/1985 | Brooks | 56/298 |
| 4,561,241 | 12/1985 | Burns | 56/330 |
| 4,607,703 | 8/1986 | Wang | 171/1 |
| 4,747,255 | 5/1988 | Roden | 56/10.4 |
| 4,926,623 | 5/1990 | Fiener | 56/60 |
| 5,148,589 | 9/1992 | Bot | 29/243.4 |
| 5,343,682 | 9/1994 | Pancochar | 56/305 |
| 5,444,968 | 8/1995 | Barton | 56/119 |

*Primary Examiner*—J. Woodrow Eldred
*Attorney, Agent, or Firm*—Townsend and Townsend and Crew LLP

[57] ABSTRACT

A guard assembly (2) is used to protect the cutter blades (20, 21) of a cane cutter (10). The guard assembly includes a guard body (4) which is mounted to the cane cutter. A series of guard blades (6) are pivotally mounted to the guard body. The guard blades are shaped, sized and positioned to permit smaller diameter objects, such as a cane (18) of a grapevine to pass between the guard blades so to be severed by the cutter blades while preventing larger diameter objects, such as posts (26), stakes and the trunks of the grapevines, from passing between the guard blades, thereby protecting both the cutter blades and the larger diameter objects from damage.

16 Claims, 6 Drawing Sheets

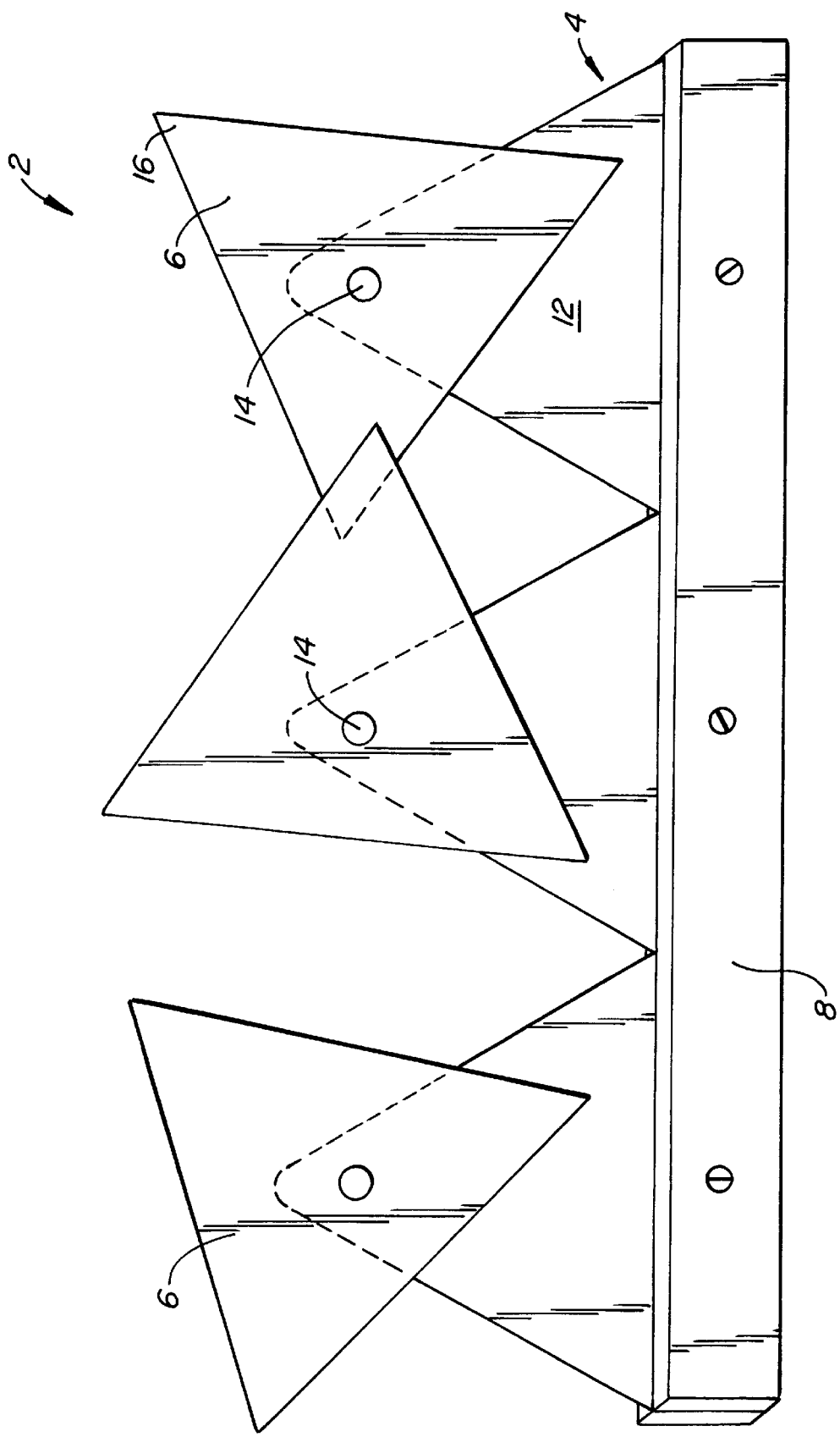

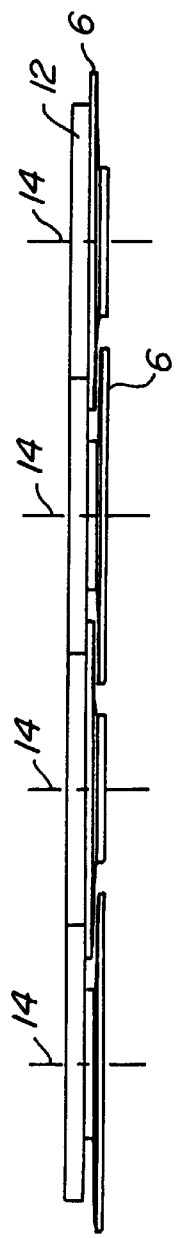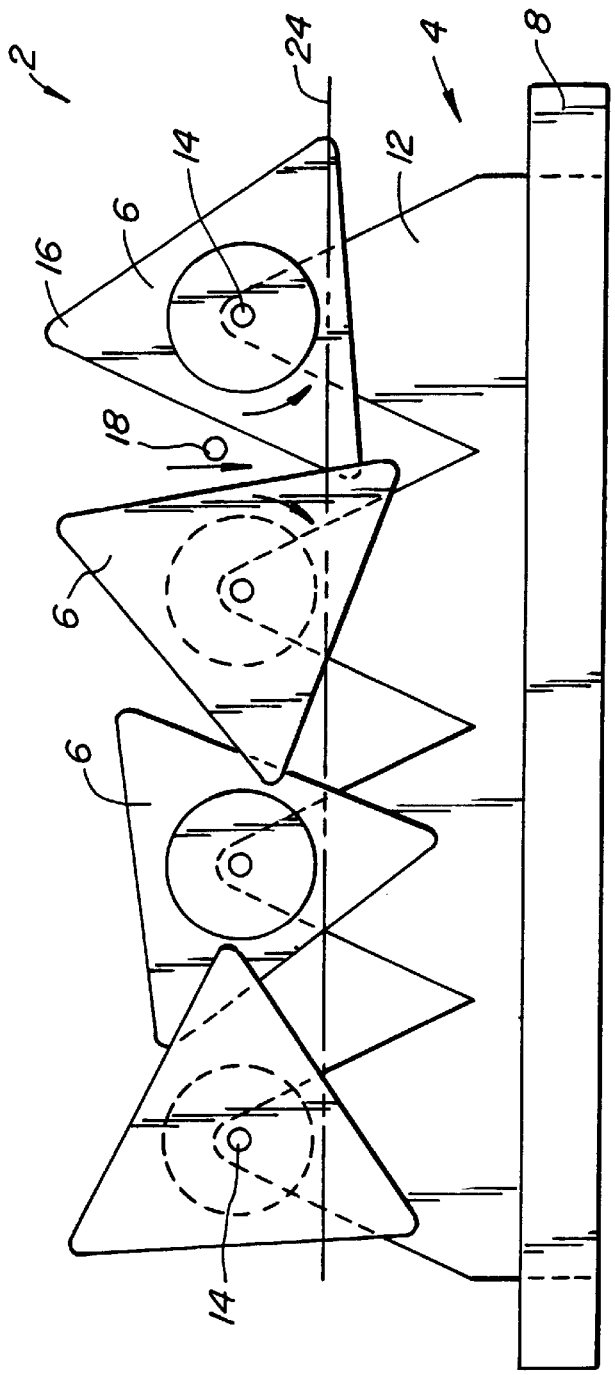

GUARD ASSEMBLY FOR CANE CUTTER

CROSS-REFERENCE TO RELATED APPLICATION

This application claims the benefit of U.S. provisional application Ser. No. 60/011,446, filed Feb. 9, 1996, entitled GUARD ASSEMBLY FOR CANE CUTTER, the disclosure of which is incorporated herein by reference.

BACKGROUND OF THE INVENTION

The most prevalent type of raisin sold in the U.S. is the natural Thompson seedless raisin. Ripe Thompson seedless grapes are cut and placed on paper trays between the rows of vines out in the vineyard. The grapes then dry naturally in the sun to form raisins. The problem with naturally drying raisins in the sun on the ground is that rain during the drying period can ruin an entire crop. To help get around this problem, a method for drying the grapes while still on the vine has been developed. Using this method the canes bearing the fruit are separated during the growing season from the canes not bearing fruit. (The canes not bearing fruit will, the next year, be the fruit-bearing canes.) Once the grapes are sufficiently ripe, the fruit-bearing canes are cut adjacent the head of the grape vine. This causes the leaves on the fruiting canes to dry up, cuts off the source of water to the grapes and allows the grapes to dry while hanging on the severed fruiting canes. It has been found that rain on the severed canes does not cause rot because good air circulation allows the grape bunches to dry out quickly after the rain has ceased.

SUMMARY OF THE INVENTION

The present invention is directed to a guard assembly for an agricultural cutter bar, specifically, a cane cutter used to cut the canes of grapevines in a vineyard. The invention prevents various components of the trellising system, such as stakes and posts, as well as the trunk of the grapevine, from engaging the blades of the cane cutter or other agricultural cutter bar, while permitting the smaller diameter canes to be cut by the cane cutter.

The cutter bar is similar to an oversized hedge trimmer having two parallel, relatively reciprocating blades defining wedge-shaped openings between the edges of the blades. Canes captured in the wedge-shaped openings between the edges of the blades are severed by the blades.

The invention is particularly adapted for use with a cane cutter, as well as other agricultural cutter bars, and includes generally a guard body mountable to the cutter bar and a series of guard blades pivotally mounted to the guard body. The guard blades are shaped and sized to permit smaller diameter objects, such as canes, to pass between the guard blades and be severed by the reciprocating cutter blades. However, the shapes, sizes and positions of the guard blades are such that larger diameter objects, such as posts, stakes and grapevine trunks, are too large to pass between the pivoting guard blades, thus preventing the cutter blades from contacting the larger diameter objects. This not only prevents damage to the post, stakes and cutter blades, but it also prevents cutting of the trunk of the grapevines.

One advantage of the invention is that it is quite adaptable to conventional agricultural cutter bars and thus is suited for retrofit applications, as well as original equipment assemblies.

Other features and advantages of the invention will appear from the following description in which the preferred embodiment has been set forth in detail in conjunction with the accompanying drawings.

BRIEF DESCRIPTION OF THE DRAWINGS

FIG. 1 is a simplified view showing a guard assembly having three guard blades made according to the invention;

FIGS. 2A and 2B are front and top views of a guard assembly made according to the invention having four guard blades;

DESCRIPTION OF THE PREFERRED EMBODIMENT

Figure 3:
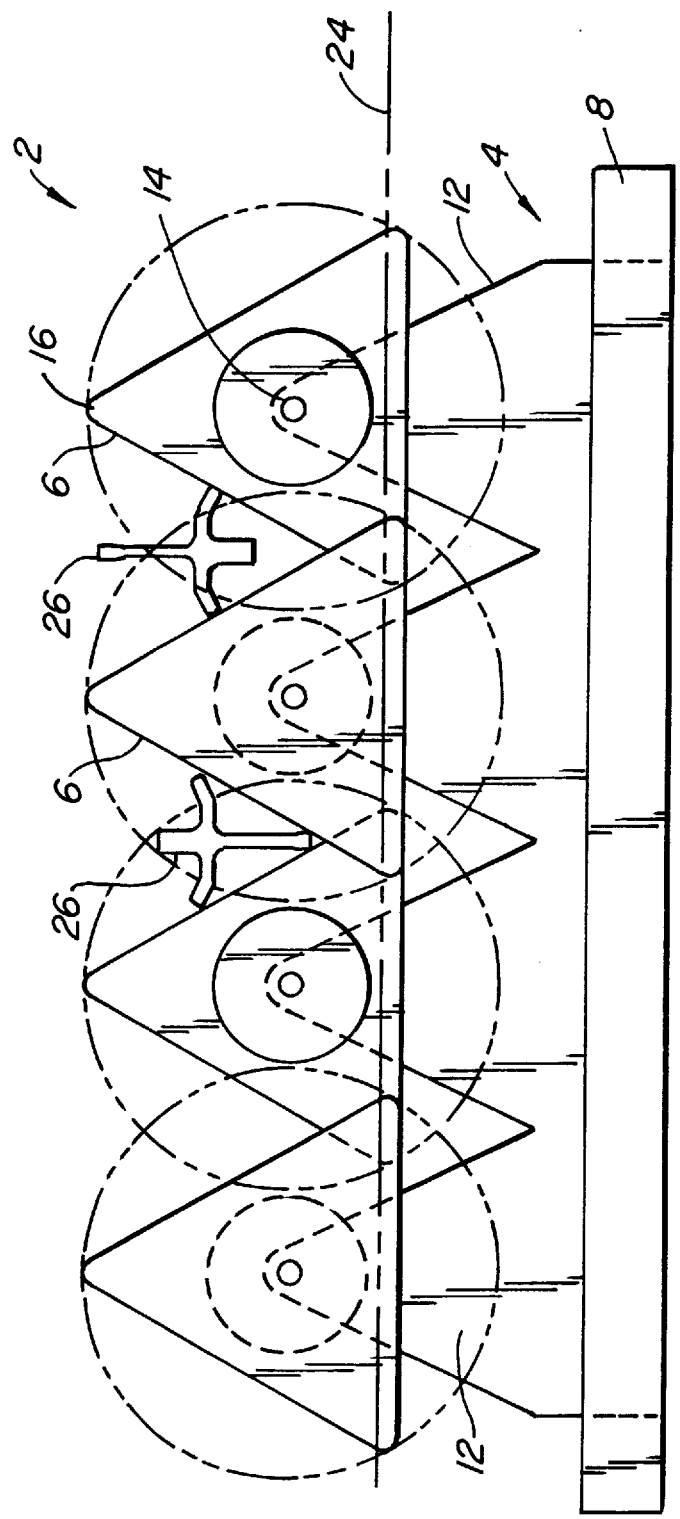
FIG. 3 is a front view of the guard assembly of FIG. 2A illustrating the path of movement of the tips of the guard blades and showing two examples of posts engaging the guard blades, the guard blades preventing the posts from passing between the guard blades.

FIG. 1 illustrates a guard assembly 2 including a guard body 4 and a series of guard blades 6. Guard body 4 includes a guard frame 8 bolted to cane cutter 10, see FIGS. 4–6. Guard body 4 also includes a series of guard mounts 12 welded to and extending from guard frame 8. Each guard mount 12 is used to pivotally mount a guard blade 6 at a pivot 14. Guard blades 6 are staggered so that the tips 16 of guard blades 6 overlap one another.

Figure 4:
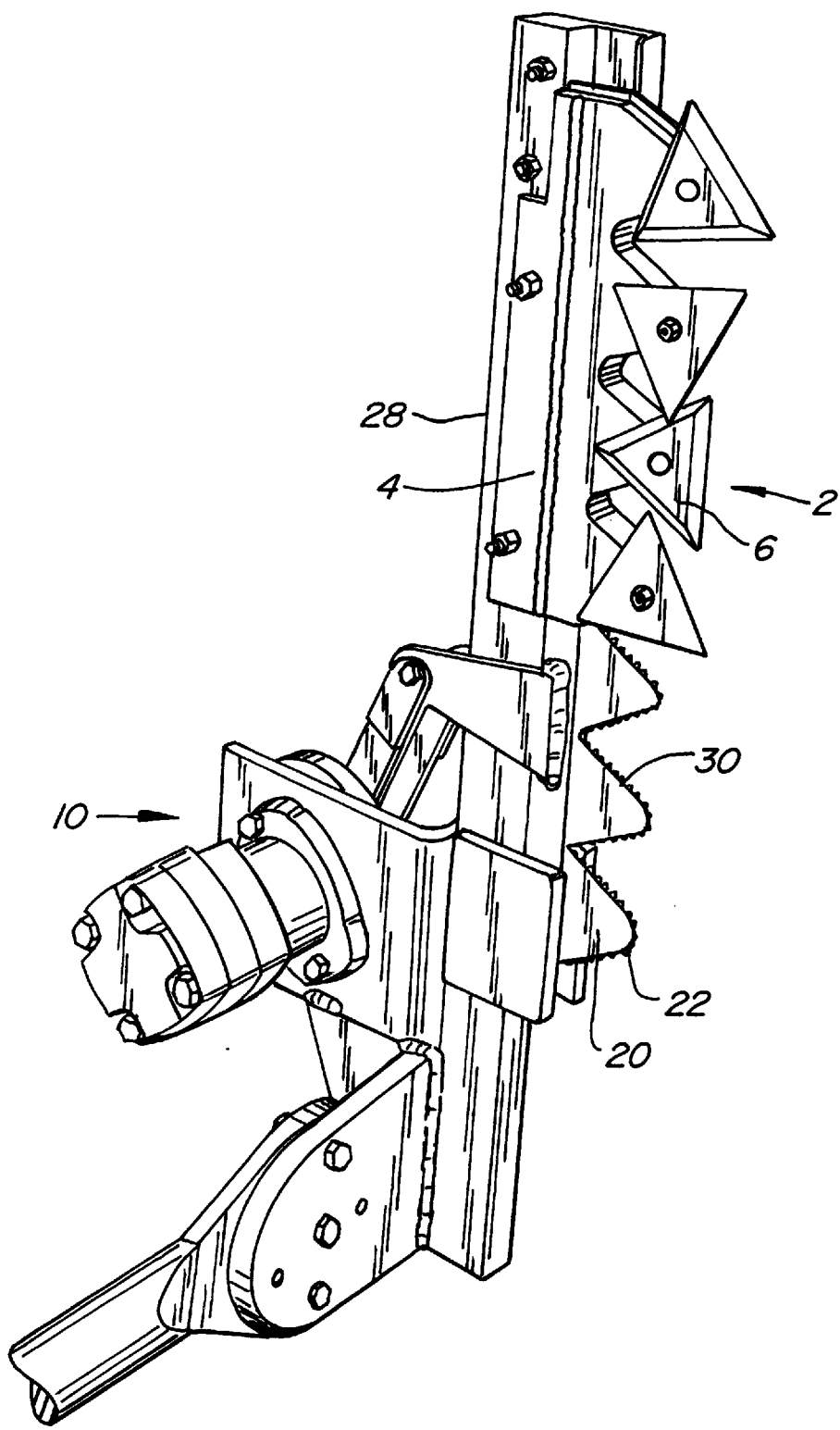
FIG. 4 illustrates a guard assembly made according to the invention mounted to a cane cutter bar.
Figure 5:
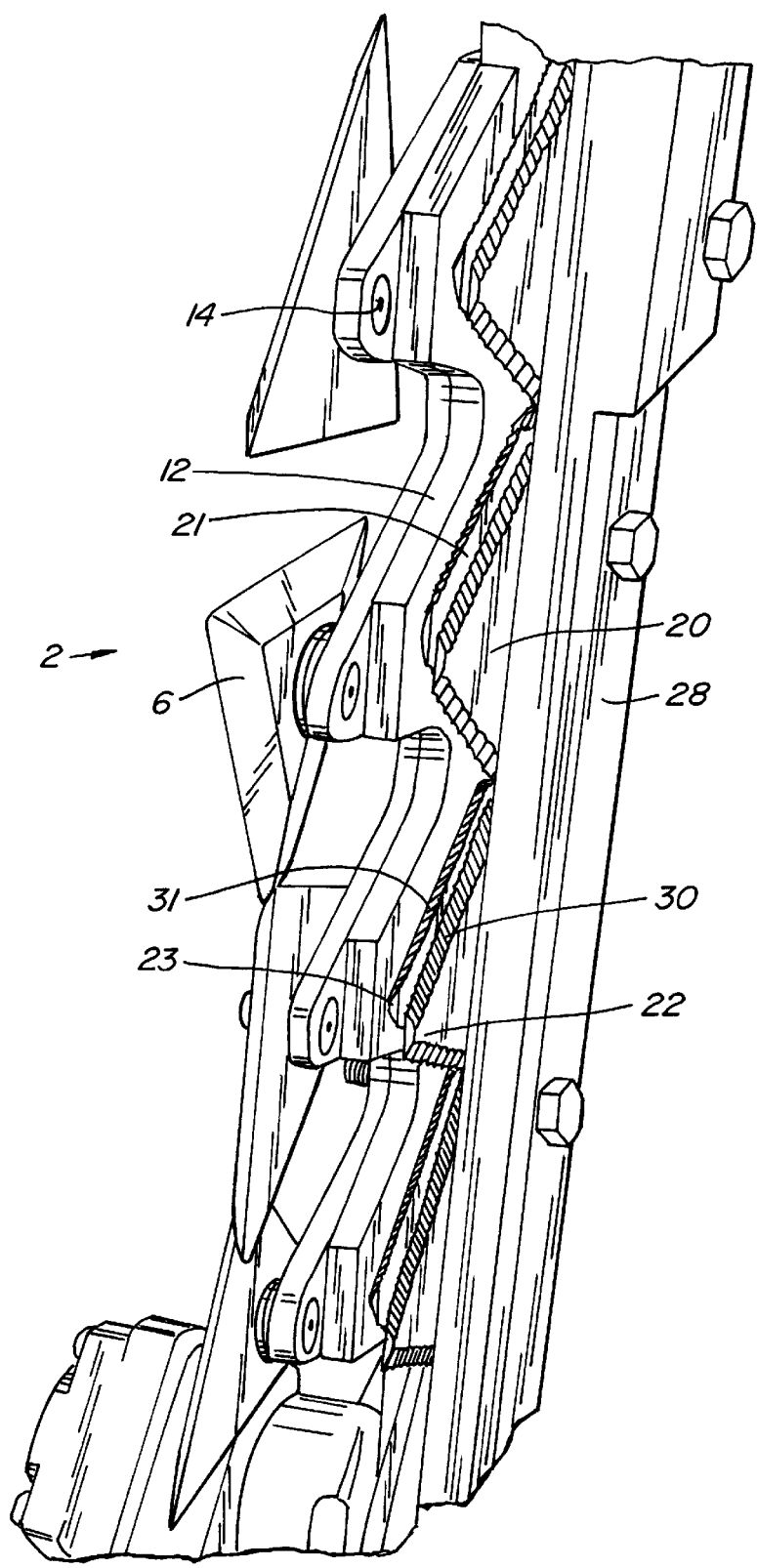
FIG. 5 is a reverse angle view of the outer end of the guard assembly and cane cutter bar of FIG. 4.

The guard blades are shaped, sized and spaced such that relatively thin objects, such as canes 18, see FIG. 2A, will pass between guard blades 6 to be severed by the reciprocating cutter blades 20, 21 of cane cutter 10, see FIGS. 4 and 5. The tips 22, 23 of cutter blades 20, 21 extend along a line 24 so that cane 18 is severed soon after passing pivots 14. However, posts 26, see FIGS. 3 and 6, are too large to pass between guard blades 6 so to prevent the posts 26, or other larger diameter objects such as stakes and trunks of grapevines, from passing between guard blades 6 and into the cutting region defined by line 24.

Figure 6:
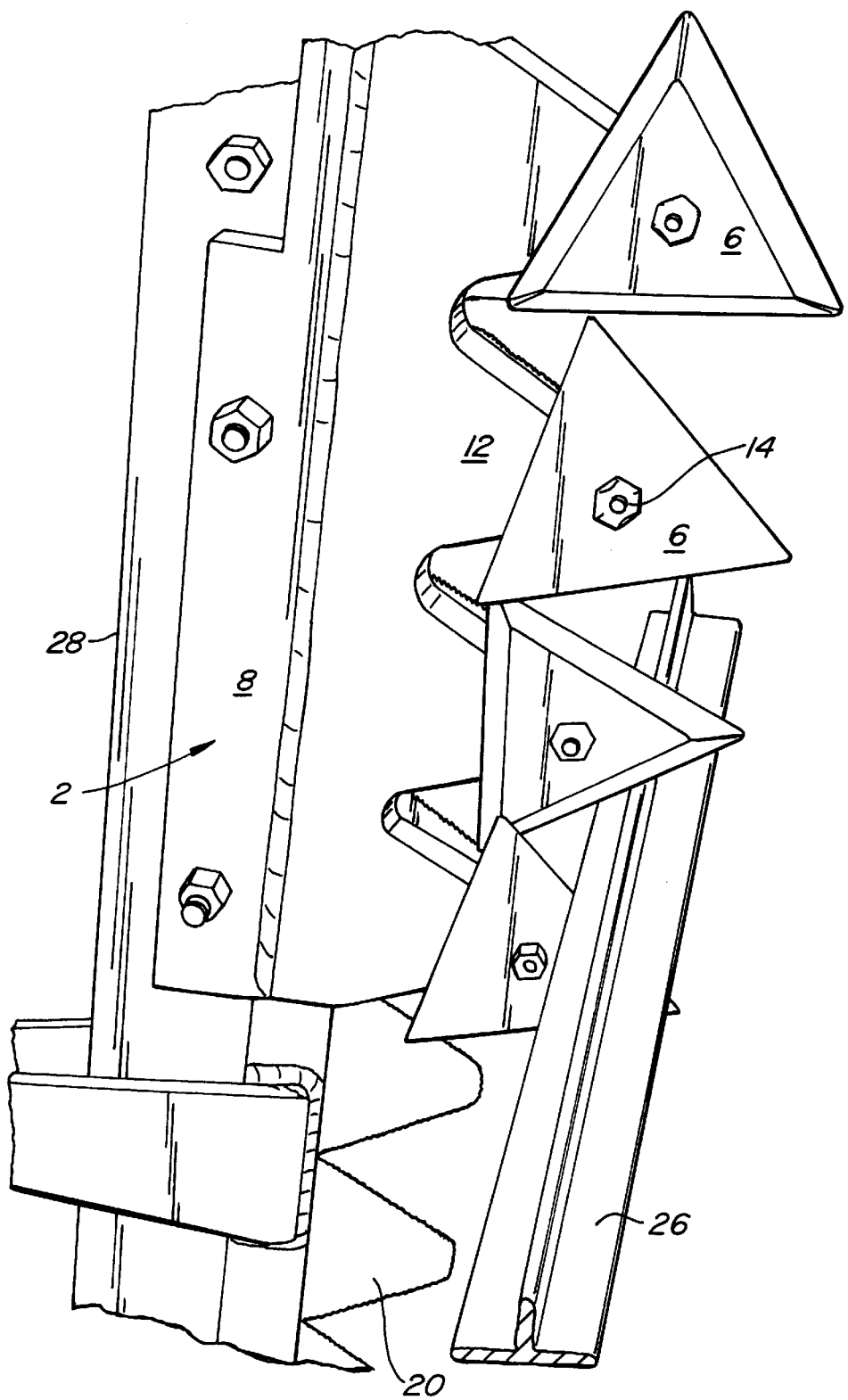
FIG. 6 is an enlarged view of the outer end of the cane cutter bar and guard assembly of FIG. 4 illustrating how a post is prevented from passing between the guard blades.

FIGS. 4–6 illustrate a guard assembly 2 bolted to the frame 28 of cane cutter 10. As can be seen from the figures, cane cutter 10 has a pair of relatively reciprocating, wedge-shaped cutter blades 20, 21, which reciprocate and cut the objects, typically canes of grapevines, which are presented between the edges 30, 31, of cutter blades 20, 21.

In use, guard assembly 2 is mounted a cane cutter 10 when the cane cutter is used to, for example, sever fruit-bearing canes from the head of the grapevines. Cane cutter 10 is moved along the row of vines cutting the desired canes. If, however, a larger diameter object, such as a post, stake or grapevine trunk, falls in the path of cane cutter 10, the larger diameter object will be preventing from passing between the pivoting guard blades 6, thus preventing damage to the object or the cutter blades 20, 21 of the cane cutter 10.

Modification and variation can be made to disclosed embodiment without departing from the subject of the invention as defined in the following claims. For example, guard blades 6 are shown, in the preferred embodiment, to be triangular. Other shapes, including regular and irregular straightsided and curvesided shapes, could be used as well. Also, pairs of guard blades could be used at each pivot point. In some circumstances, it may be desirable to have the guard blades be biased towards an initial position. While it is preferable that guard blades 6 be pivotally mounted, in some situations guard blades 6 may be fixed-position guard blades.

What is claimed is:

1. A guard assembly for an agricultural cutter bar comprising:
    a guard body mountable to an agricultural cutter bar, said guard body having a guard frame and a plurality of guard mounts attached to and extending outward from said guard frame;
    a series of guard blades mounted to the guard mounts; and
    said guard blades comprising shapes means for:
        permitting smaller diameter objects to pass between said guard blades; and
        preventing larger diameter objects from passing between said guard blades.

2. The guard assembly of claim 1 wherein said guard mounts are triangular in shape.

3. The guard assembly of claim 1 wherein said guard mounts define open regions therebetween.

4. The guard assembly of claim 3 wherein the open regions are generally triangular in shape.

5. The guard assembly of claim 1 wherein said guard blades are pivotally mounted to said guard mounts.

6. The guard assembly of claim 1 wherein said guard blades are generally triangular in shape.

7. A guard assembly for an agricultural cutter bar comprising:
    a guard body mountable to an agricultural cutter bar, said guard body further comprising a guard frame and plurality of guard mounts attached to said guard frame, said guard mounts defining open regions therebetween;
    a series of guard blades pivotally mounted to the guard mounts; and
    said guard blades comprising shape means for:
        permitting smaller diameter objects to pass between said guard blades; and
        preventing larger diameter objects from passing between said guard blades.

8. The guard assembly of claim 7 wherein said guard blades are generally triangular in shape.

9. The guard assembly of claim 8 wherein said open regions are generally triangular in shape.

10. A reciprocating agricultural cutter assembly comprising:
    a cutter comprising a frame and first and second relatively reciprocating cutter bars supported by the frame, the cutter bars having reciprocating cutting portions, said cutting portions defining cutting regions therebetween; and
    a guard assembly comprising:
        a guard body mounted to the frame;
        a series of guard blades pivotally mounted to the guard body;
        said guard blades comprising shapes means for:
            permitting smaller diameter objects to pass between said guard blades; and
            preventing larger diameter objects from passing between said guard blades.

11. A reciprocating agricultural cutter assembly comprising:
    a cutter comprising a frame and first and second relatively reciprocating cutter bars supported by the frame, the cutter bars having reciprocating cutting portions, said cutting portions defining cutting regions therebetween; and
    a guard assembly comprising:
        a guard body mounted to the frame;
        a series of guard blades mounted to the guard body;
        said guard blades comprising shapes means for:
            permitting smaller diameter objects to pass between said guard blades; and
            preventing larger diameter objects from passing between said guard blades,
    wherein:
        said guard body further comprises a guard frame and plurality of guard mounts attached to said guard frame;
        said guard mounts define open regions therebetween; and
        said guard blades are pivotally mounted to said guard mounts.

12. The reciprocating agricultural cutter assembly of claim 11 wherein said guard blades are triangular in shape.

13. The reciprocating agricultural cutter assembly of claim 12 wherein:
    said guard mounts are generally triangular in shape; and
    the open regions are generally triangular in shape.

14. The reciprocating agricultural cutter assembly of claim 10 wherein said cutting portions comprise cutting edges.

15. A guard assembly for an agricultural cutter bar comprising:
    a guard body mountable to an agricultural cutter bar, said guard body having:
        a guard frame; and
        a plurality of guard mounts attached to said guard frame, said guard mounts defining open regions therebetween; and
    a series of guard blades mounted to the guard mounts, said guard blades at least partially filling said open regions;
    said guard blades comprising shapes means for:
        permitting smaller diameter objects to pass between said guard blades; and
        preventing larger diameter objects from passing between said guard blades.

16. A guard assembly for an agricultural cutter bar comprising:
    a guard body mountable to an agricultural cutter bar, said guard body comprising a guard frame and plurality of guard mounts attached to said guard frame;
    a series of guard blades pivotally mounted to said guard mounts; and
    said guard blades comprising shapes means for:
        permitting smaller diameter objects to pass between said guard blades; and
        preventing larger diameter objects from passing between said guard blades,
    wherein said guard blades are pivotally mounted to said guard mounts.

* * * * *